(12) United States Patent
Johnston et al.

(10) Patent No.: US 10,120,534 B2
(45) Date of Patent: Nov. 6, 2018

(54) DYNAMIC USER INTERFACE OF INTER-RELATED SYSTEMS MANAGEMENT WIDGETS

(71) Applicant: Cisco Technology, Inc., San Jose, CA (US)

(72) Inventors: Jay Johnston, Raleigh, NC (US); Keying Bi, San Jose, CA (US); Subroto Bagh, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 15/272,255

(22) Filed: Sep. 21, 2016

(65) Prior Publication Data

US 2018/0081501 A1 Mar. 22, 2018

(51) Int. Cl.
*G06F 3/0482* (2013.01)
*H04L 29/08* (2006.01)
(Continued)

(52) U.S. Cl.
CPC .......... *G06F 3/0482* (2013.01); *G06F 9/451* (2018.02); *G06F 11/3055* (2013.01); *H04L 67/025* (2013.01)

(58) Field of Classification Search
CPC .... G06F 3/0482; G06F 11/3055; G06F 9/451; G06F 3/04842; G06F 17/30398;
(Continued)

(56) References Cited

U.S. PATENT DOCUMENTS 9,112,974 B1    8/2015    Wilsie et al.
9,720,554 B2 *   8/2017    Frohwein ............... G06F 3/048
(Continued)

*Primary Examiner* — Jeffrey A Gaffin
*Assistant Examiner* — Ayesha E Huertas Torres
(74) *Attorney, Agent, or Firm* — Hickman Palermo Becker Bingham LLP

(57) ABSTRACT

Techniques are disclosed for automatically generating a dynamic user interface of inter-related systems management widgets for an application program. In an embodiment, in response to detecting an event, the application program selects a primary widget from multiple widgets to display on the user interface. In response to such selection of the primary widget, the application program queries a data store that is stores tags associated with widgets, using one or more particular tags that are associated with the primary widget. Based on the querying, the application program determines one or more secondary widgets from the multiple widgets that are associated with at least one of the one or more particular tags of the primary widget. For each particular secondary widget among the one or more secondary widgets, the application program determines correlation data that measures correlation of the particular secondary widget to the primary widget. Based on the correlation data of the particular secondary widget, the application program determines whether to display the particular secondary widget on the user interface in a particular arrangement comprising the particular secondary widget and one or more other secondary widgets from among the one or more secondary widgets.

20 Claims, 6 Drawing Sheets

(51) Int. Cl.
*G06F 11/30* (2006.01)
*G06F 9/451* (2018.01)

(58) Field of Classification Search
CPC ..... G06F 3/0481; H04L 67/025; H04L 41/22; H04L 43/04; H04L 43/045
See application file for complete search history.

(56) References Cited

U.S. PATENT DOCUMENTS

| | | |
|---|---|---|
| 2010/0023874 A1 | 1/2010 | Frohwein |
| 2014/0181676 A1 | 6/2014 | Samborskyy et al. |
| 2014/0258873 A1 | 9/2014 | Muthu et al. |
| 2016/0112294 A1 | 4/2016 | Annamalai et al. |

* cited by examiner

Fig. 3

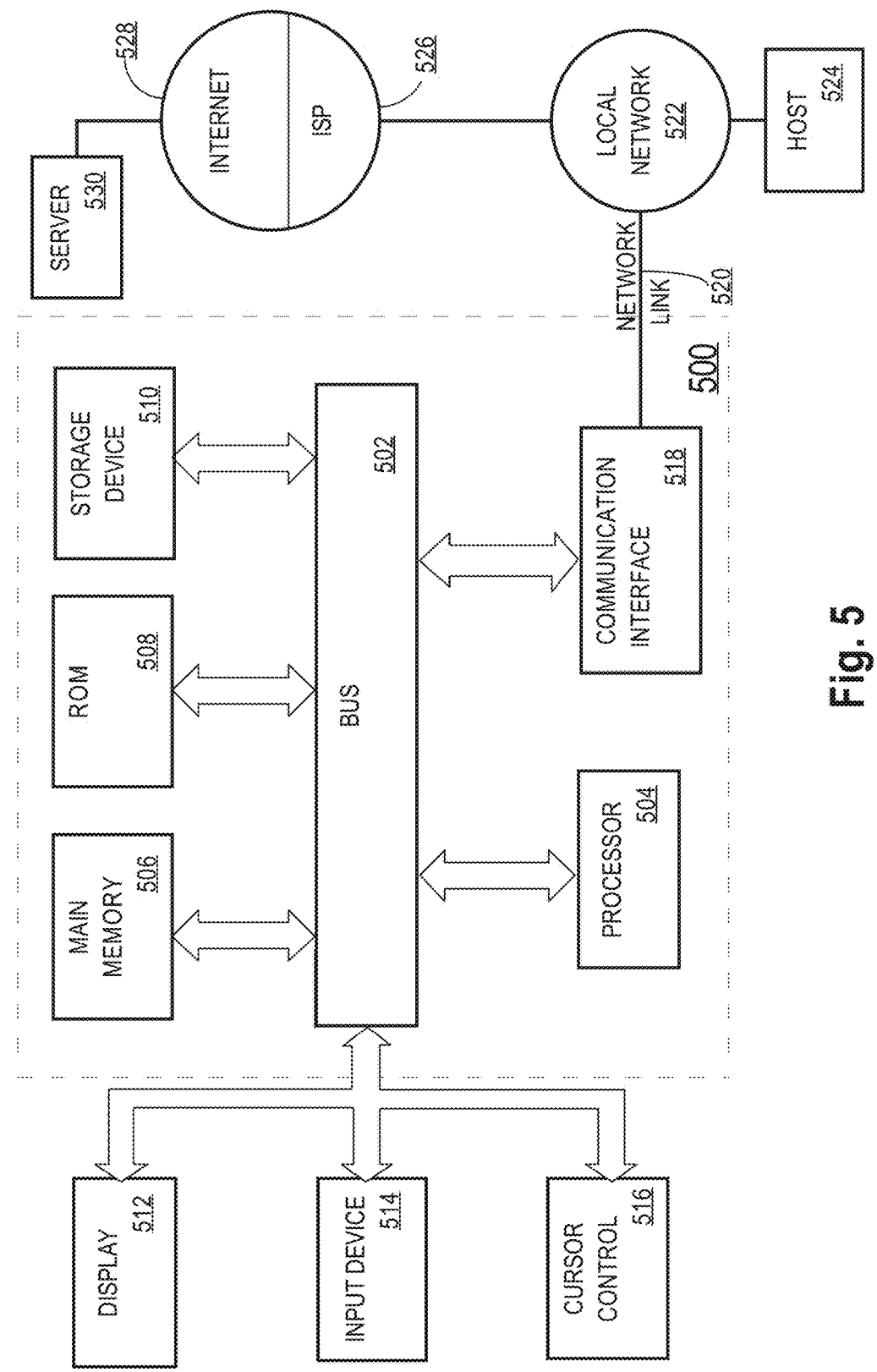

DYNAMIC USER INTERFACE OF INTER-RELATED SYSTEMS MANAGEMENT WIDGETS

TECHNICAL FIELD

The present disclosure generally relates to improved techniques for computer software and computer hardware in the field of computer systems management. The disclosure relates more specifically to a dynamic user interface of inter-related systems management widgets.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

With the growth in number of features that are available for monitoring and configuring computer systems, user interfaces of system management consoles face significant challenges in presenting these multitude of features to a user. The challenge is further exacerbated with shrinking display sizes of the user devices. Increasingly users prefer using their handheld devices to monitor and configure managed computer systems, user interfaces need to adapt to present meaningful information on constrained display spaces. User interfaces that simply clutter the interfaces with numerous menus, sub-menus, sub-sub-menus and so force, each with its own options, sub-options, sub-sub-options and so forth inadvertently complicate the user's navigation through the interface. Navigating such a user interface to locate a particular feature of interest may frustrate the user resulting in a severely degraded user experience.

In addition to the growth of features, systems management consoles are also confronted with the complex task of presenting an overarching view of the computer system's state. Traditionally, the computer system's overview has been confined to the rollups of health statuses through components and sub-components all the way up-to the health status of the system. A failure at a lower level component, for example a failure of a storage disk in a storage array, is propagated to the next level of the storage array and then, to the next level of the storage subsystem and perhaps, even up to the overall system health status.

Although, such health status roll-ups may present an overview of the system's health, the roll-up is useful for insular failures of components and fails to be descriptive for inter-related failures. For example, if many components, such as CPU, memory and network, have failures, a user of a systems management console may have difficulty in assessing the root cause of the failures. In fact, what may have led to these failures may have been a wrong configuration of a feature within a router that caused excessive consumption of the router's memory and CPU, which in turn caused an increased rate of dropped packets. It would be impossible for the user to ascertain the root cause of the problem just from a warning health state of the router or a failure/critical failure health state of the CPU, memory and network. The user would have to navigate one-by-one through many widgets of the user interface to find any components exhibiting a problem, and deduce how those components might correlate and contribute to the overall system failure.

BRIEF DESCRIPTION OF THE DRAWINGS

In the drawings:

FIG. 3 depicts an example of user interface for configuring threshold values to generate and display CPU and associated secondary widgets, in an embodiment.

FIG. 5 is a block diagram that illustrates a computer system upon which an embodiment of the system may be implemented.

DESCRIPTION OF EXAMPLE EMBODIMENTS

Figure 1:
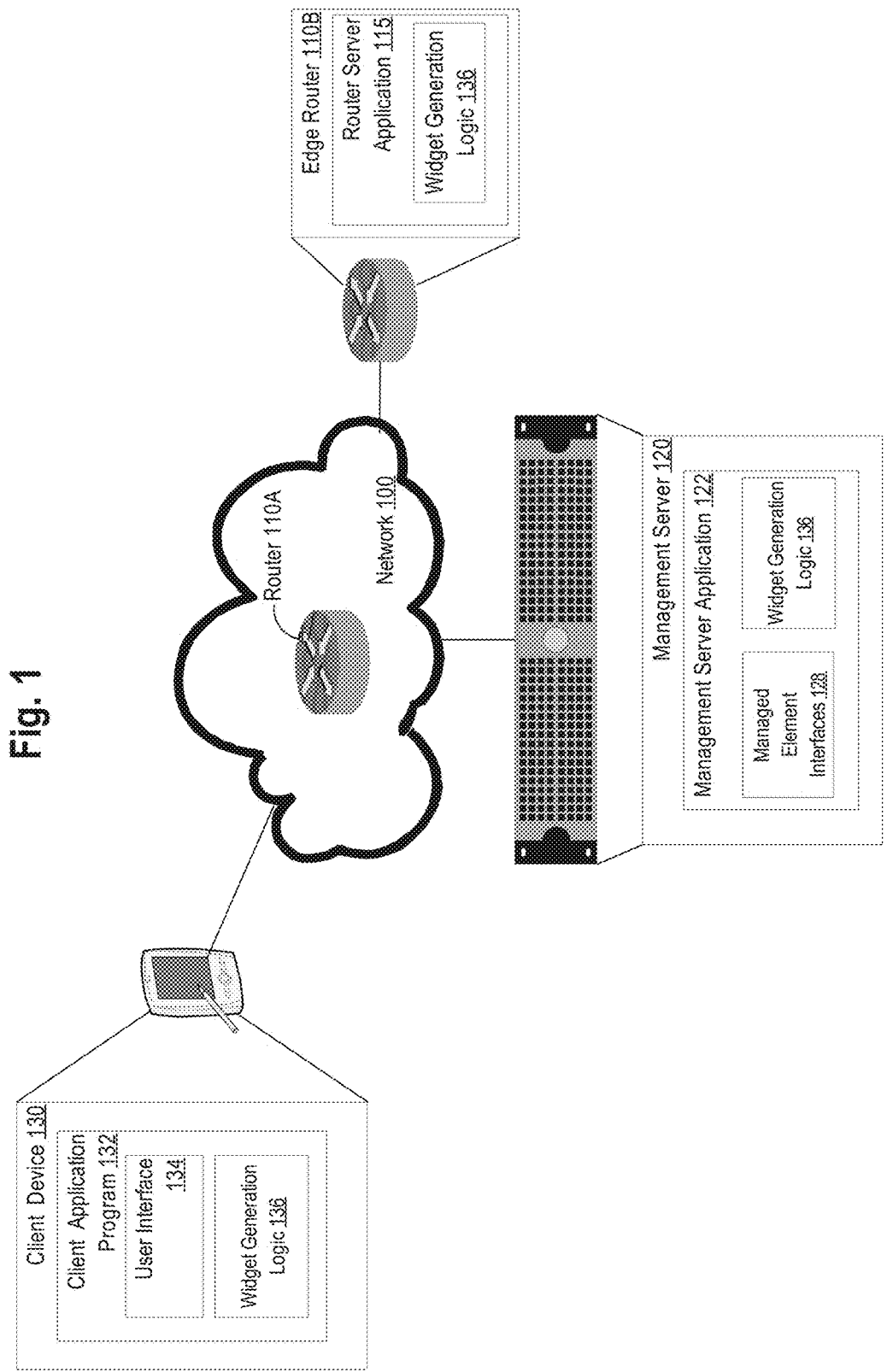
FIG. 1 depicts an example operating environment upon which an embodiment may be implemented.

Dynamic user interface of inter-related systems management widgets is described. In the following description, for the purposes of explanation, numerous specific details are set forth in order to provide a thorough understanding of the present disclosure. It will be apparent, however, to one skilled in the art, that the present disclosure may be practiced without these specific details. In other instances, well-known structures and devices are shown in block diagram form in order to avoid unnecessarily obscuring the present disclosure.

Embodiments are described herein according to the following outline:

1.0 General Overview
  2.0 Example Operating Environment
  3.0 Functional Description
    3.1 Threshold Configuration for Displaying Widgets
    3.2 Displaying Primary Widget
    3.3 Determining Associated Secondary Widgets
    3.4 Determining Arrangement of Secondary Widgets
  4.0 Implementation Mechanisms—Hardware Overview
  5.0 Extensions and Alternatives
  1.0 General Overview Dynamic user interface of inter-related systems management widgets is described. In an embodiment, a computer system automatically generates a user interface for an application program. In response to the computer system detecting an event, the application program selects a primary widget from a plurality of widgets to display on the user interface. In response to selecting the primary widget, the application program uses one or more particular tags that are associated with the primary widget, to query a data store that is storing tags associated with widgets. Based on the query, one or more secondary widgets from the plurality of widgets are determined such that these one or more secondary widgets are associated with at least one of the one or more particular tags of the primary widget. For each particular secondary widget among these one or more secondary widgets, the application program determines correlation data that measures correlation of the particular secondary widget to the primary widget. Based on the correlation data of the particular secondary widget, the application program determines whether to display the particular secondary widget on the user interface in a particular arrangement comprising the particular secondary widget and one or more other secondary widgets from among the one or more secondary widgets.

Primary and secondary widgets may describe one or more "managed system elements." The term "managed system elements" refers herein to any distinguishable hardware or software component of one or more computer systems that may be managed through a user interface of an application. For example, a computer system itself may be a managed system element, particularly when it is part of a collection of computer systems like that of a data center or of computer systems that are merely coupled to each other through a network. As part of managing a managed system element, management data about the managed system element may be requested. The term "management data" of a managed system element refers herein to monitoring data and/or configuration data associated with the managed system element. For example, different sensor data collected for the managed system element and provided to a user interface are part of management data of the managed system element. Similarly, data that describes an enabled state of a managed system element or data provided to change the enabled state of the managed system element may also be part of management data of the managed system element.

2.0 Example Operating Environment

FIG. 1 depicts an example operating environment upon which an embodiment may be implemented. In FIG. 1, client device 130 includes one or more processors and memory storing client application program 132, which when executed by the one or more processors presents user interface 134 on the display of client device 130, in an embodiment. Client device 130 is connected through network 100 to one or more computer systems that execute management server applications such as management server application 122 and router server application 115.

Network 100 comprise a communications network, such as any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

In an embodiment, client device 130 establishes a connection with edge router 110B through network 100. Using the connection, client application program 132 receives management data from router server application 115 that describes management information about edge router 110B including various managed system elements of edge router 110B. For example, the management data may include monitoring data about edge router 110B CPU utilization or network traffic bandwidth consumption by one or more ports of edge router 110B, or configuration data for configuring VPN service at edge router 110B.

In an embodiment, due to resource constraints, a managed computer system does not host a server application for a client application program to connect and receive management data. Router 110A may have no router server application loaded for servicing management data directly to client device 130. However, router 110A may be able to provide its management data through network 100 to management server 120. Management server 120 may retrieve the management data by managed element interfaces 128 listening to event notifications from router 110A, or by issuing requests over network 100 to router 110A for the management data. Management element interfaces 128 may use management protocols such as SNMP, WSMAN, RESTMAN to receive information from router 110A. In some embodiments, although edge router 110B has its own router server application 115, management server 120 may serve as an aggregator of management data from managed computer system coupled to Network 100, and may similarly receive management data from edge router 110B. Management server application 122 of management server 120 may provide management data to client application 132 to display on user interface 134.

In an embodiment, widget generation logic 136 may generate an arrangement of one or more widgets for user interface 134 using the techniques described herein. Widget generation logic 136 may be part of a server application, such as management server application 122, or part of a managed device application, such as router server application 115, or part of an application on a client device itself, such as client application program 132, or any combination thereof.

In an embodiment, client application program 132 is a web browser that receives browser executable commands from server applications using HTTP or HTTPs protocols. The received HTTP/HTTPS packets may contain management data formatted in HTML that can be readily parsed by the web-browser and displayed as part of user interface 134 as one or more widgets. In such an embodiment, client application program 132 receives and parses the HTML containing the arrangement of widgets, and displays the widgets on user interface 134.

In another embodiment, management data may be formatted in structured or semi-structured data formats such as XML and JSON. The browser executable commands, such as Javascript, received by client device 130 and executing as part of application program 132 may process and present the received (semi-)structured management data in user interface 134 as one or more widgets. Application program 132 may include widget generation logic 136 to determine and generate a particular arrangement of one or more widgets according to the techniques described herein and display the arrangement on user interface 134.

Each of widget generation logic 136, user interface 134, client application program 132, managed system element interfaces 128, management server application 122, and router server application 115 is part of a computer system and may be implemented in software, hardware, or a combination of software and hardware. For example, one or more of widget generation logic 136, user interface 134, client application program 132, managed system element interfaces 128, management server application 122, and router server application 115 may be implemented using stored program logic.

3.0 Functional Description

Figure 2:
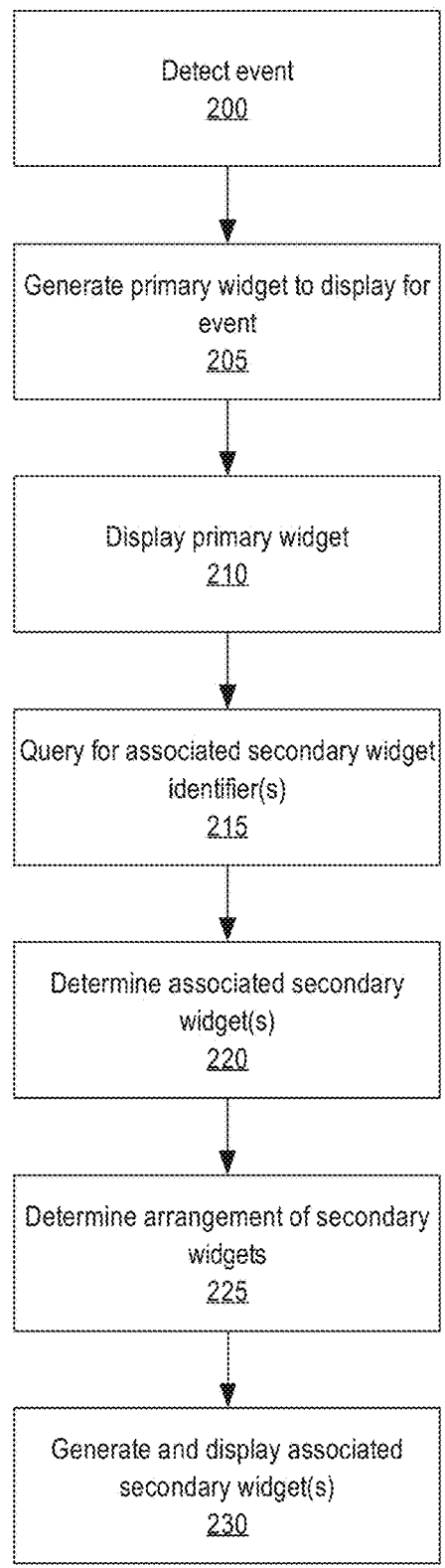
FIG. 2 is a flow diagram that depicts a process of generating and displaying widgets, in an embodiment.

FIG. 2 is a flow diagram that depicts a process of generating and displaying widgets, in an embodiment. At block 200, a server application, such as router server application 115 or management server application 122, detects an event for a widget generation.

In one embodiment, the event is triggered by a request from a user of client application 132 to access management data of a managed system element such as a CPU or a VPN service of edge router 110B. For example, the request may be initiated by the user selecting on user interface 134 a user interface control for presenting the CPU information of edge router 110B.

3.1 Threshold Configuration for Displaying Widgets

In another embodiment, at block 200, an event is detected when a configured threshold on a managed system element is exceeded. The managed system element may be associated with one or more sensors that monitor different aspects of the managed system element. For example, a CPU of edge router 110B may be associated with a temperature sensor and a CPU utilization sensor. The temperature sensor may monitor the temperature of the CPU and provide the monitoring data of temperature readings to router server application 115. The CPU utilization sensor may monitor the percentage of CPU resources utilized by one or more processes running on the edge router 110B CPU and similarly, provide the monitoring data of CPU utilization readings to router server application 115. Server application 115 may periodically request and receive CPU utilization sensor monitoring data and CPU temperature sensor monitoring data. If any of these sensors' readings in the monitoring data exceed a threshold value for the corresponding sensor, an event may be triggered and detected at block 200 of FIG. 2 in order to generate one or more widgets corresponding to the CPU sensors.

A threshold value of a sensor may be pre-configured and/or can be adjusted by a user. In an embodiment, a pre-configured threshold value is programmed into the server applications and an event is generated after the pre-configured threshold value is exceeded. In another embodiment, a user, using user interface 134, configures a threshold for a sensor of a managed system element of the widget. The user may use various user interface controls of user interface 134 to request a change in a threshold value for the sensor.

In a related embodiment, the managed system element may have multiple user-configurable and/or pre-programmed thresholds for a sensor. For example, the CPU utilization sensor may have a warning threshold and a critical threshold. The critical threshold may be pre-programmed while the warning threshold may be user configurable.

In an embodiment, a user may configure an option for whether exceeding a threshold value would generate an event causing presentation of a corresponding widget. In a related embodiment, when a sensor has multiple thresholds, a user may select which particular threshold when exceeded would trigger generation and surfacing (displaying) of a widget for the managed system element of the sensor.

FIG. 3 depicts an example of user interface 134 for configuring a threshold of CPU utilization to generate and display a CPU widget, in an embodiment. Widget 310 includes a user interface control for a user to select and drag vertically to an appropriate level. The appropriate level represents the configured critical threshold to generate and display the CPU utilization widget.

In an embodiment, once a sensor value is detected to have exceed the configured threshold value for the sensor, an event is triggered. Once the event is detected at block 200, the widget generation logic 136 may generate the corresponding widget for the managed system element of the sensor at block 205 of FIG. 2.

As illustrated in FIG. 3, the user has configured a critical threshold value of 85% utilization for the CPU utilization sensor to trigger an event to generate a CPU widget on user interface 134. If a reading for the CPU utilization sensor exceeds the configured threshold value of 85%, widget generation logic 136 may generate the CPU widget with the monitoring data of the CPU utilization sensor displayed in the widget.

In an embodiment, a managed computer system, such as router 110A, edge router 110B or management server 120, is configured to generate events based on user defined or pre-configured threshold values of a sensor associated with a managed system element. The managed computer system that generated the event, broadcasts (or sends to client device 130) over network 100 and/or internally the event data. A background service of server applications 115 or 122 may be continuously listening for any notifications from the managed computer system to detect the event. If the background service receives the data of the event that the threshold value has been exceeded, the server application may load widget generation logic 136 or send the event data to client program 132 to load widget generation logic 136 to generate a widget for the managed system element.

In a related embodiment, the user may have already launched client application program 132 on user client device 130 at the time the notification is received. In such an embodiment, widget generation logic 136 updates user interface 134 with the widget for the managed system element.

3.2 Displaying Primary Widget

At block 205, using the data associated with the detected event, widget generation logic 136 extracts the management data of the managed system element and generates a primary widget that presents the management data. The term "primary widget" refers herein to a widget that is generated directly in response to an event as opposed to other widgets referred to as "secondary widgets" that are generated using the techniques described herein, in response to the generation of the "primary widget."

At block 210, the primary widget is rendered on user interface 134 for display to a user of client device 130. For example, for a detected event regarding a CPU of router 110B, widget generation logic 136 may process the management data and based on the processed management data generate HTML code for the primary widget. Client application program 132 may render the HTML code to display the primary widget containing the management data of the router 110B CPU on user interface 134 for the user. The generated primary widget may depict current reading of the CPU sensor, the threshold value that was exceeded and/or the previous reading of the CPU sensor that exceeded the threshold value.

Figure 4A:
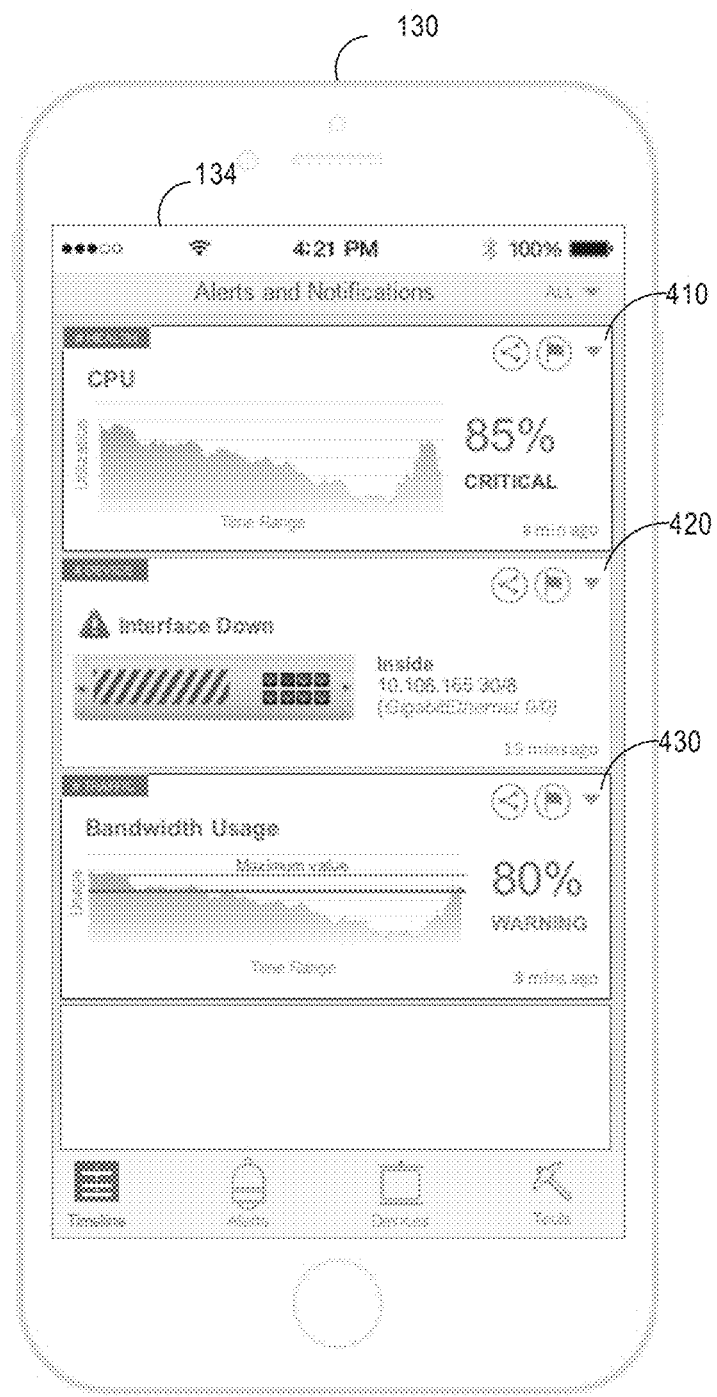
FIGS. 4A and 4B depict an example of user interface presenting primary and secondary widgets, in one or more embodiments.
Figure 4B:
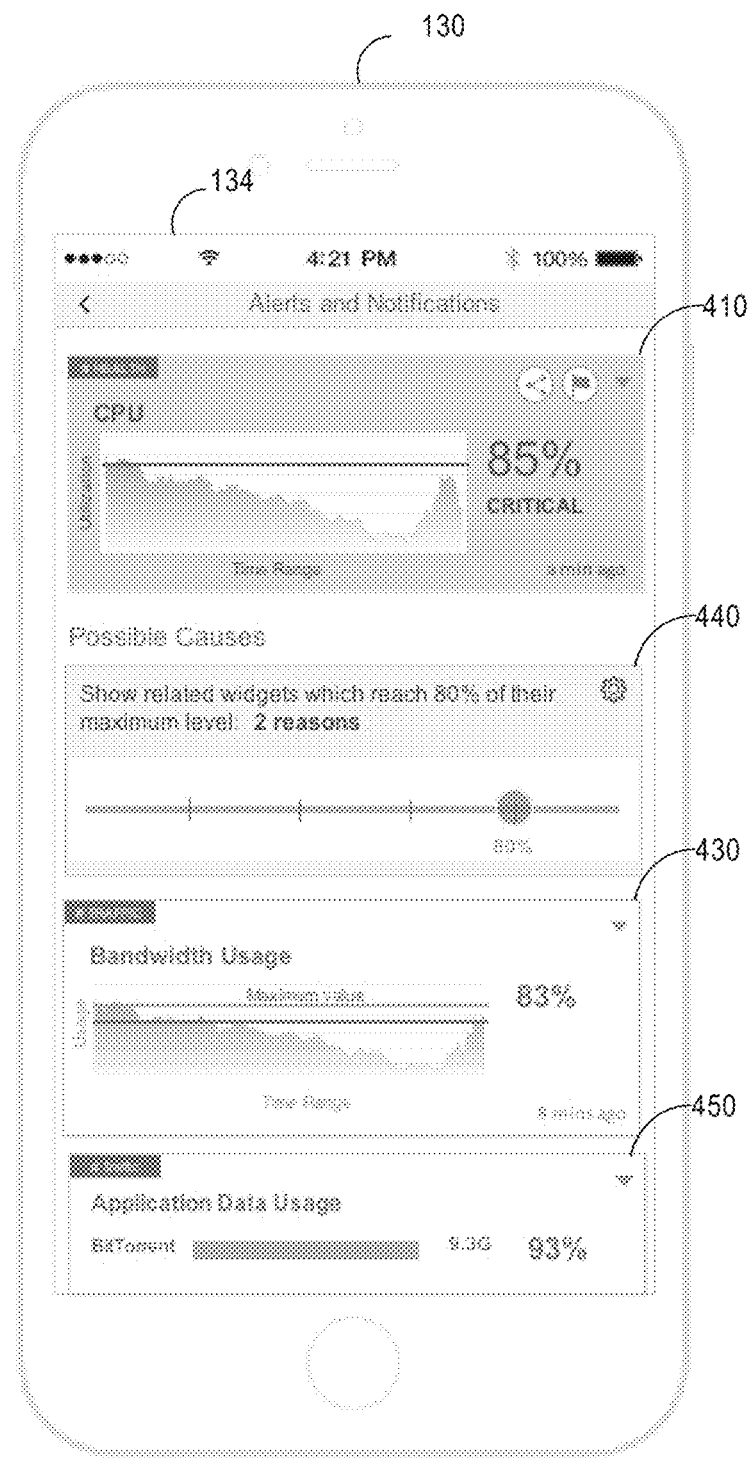

FIGS. 4A and 4B depict examples of user device 130 with user interface 134, in one or more embodiment. CPU widget 410 is displayed on user interface 134 because CPU utilization has exceeded the configured critical threshold of 85% (as discussed for the examples depicted in FIG. 3). The depicted graph in widget 410 visually presents the monitoring data of the CPU utilization sensor to a user. The monitoring data represents the current as well as previous readings of the CPU utilization sensor arranged temporally in a bar chart. Widget 410 further depicts the reading of the CPU utilization sensor that exceeded the configured threshold value with a time stamp of this detected event ("a min ago").

3.3 Determining Associated Secondary Widgets

Continuing with FIG. 2, at block 215, widget generation logic 136 queries a data store that stores tags associated with widgets to determine which other/secondary widgets to generate in an embodiment. A widget may be associated with one or more tags in the widget data store. The associated tags may categorize the widget to one or more specific or general categories. Based on management data presented by the widget being related to these categories. Table 1 below recites examples of identifiers of widgets and the tags associated with the widgets; the widget identifiers and the general or specific category tags stored in association each other in the widget data store.

TABLE 1

Exemplary Portion of Data Represented in Widget Data Store

| Widget Identifier | Associated Tags |
|---|---|
| Firewall Device | Firewall Device, Router, Network Configuration, Network, AAA, Failover, Clustering, Identity, Licensing, Management, NAT, Netflow, Threat Detection, Anyconnect, Web VPN, L2L VPN, Access-list, Interfaces, CPU, 110B |
| CPU | CPU, Memory, Platform, Performance, Router |
| Interfaces | Performance, Network, Interfaces, Network Configuration, 10.106.165.30 |
| Bandwidth Usage | Network, Bandwidth, Performance, 10.106.165.30 |

General category tags may describe types or features of management system element(s) associated with a widget, and/or a type of management data described in the widget. For example, the widget identified with the "Firewall Device" identifier is associated with a firewall device managed system element. The firewall device may itself be a component of another managed system element such as edge router 110B. As such, the "Firewall Device" widget is tagged with general categories of "Firewall Device", "Router", "Network." Also, since the "Firewall Device" widget, in this example, is for configuring the firewall device managed system element, the widget identifier is also associated with a "Network Configuration" tag. Other associated tags, such as "AAA" (Authentication, Authorization, and Accounting), "Failover", "Clustering," describe features that can be configured through the "Firewall Device" widget. Yet another set of tags for the "Firewall Device" widget of Table 1 describes managed system elements that may be affected by the management data (network configuration) of the firewall device. Such tags, as recited in Table 1, include "Interfaces" and "CPU."

Specific category tags may describe the actual instance(s) of one or more managed system elements with which a widget is associated. Additionally or alternatively, specific category tags may describe the actual instance(s) of one or more configuration items to which the widget is related. Continuing with the examples recited in Table 1, the "Firewall Device" widget is associated with the "110B" tag which denotes that the widget configures the firewall device of edge router 110B.

In an embodiment, a specific category tag is dynamically assigned to one or more widgets. During the runtime, server application 115 or 122 may determine that a particular managed system element is associated with one or more widgets. If so, the server application may insert a new tag identifying the managed system element in association with identifiers of the one or more widgets into a widget data store.

For example, router server application 115 detects that a host computer system is connected to an interface of edge router 110B and that the interface is receiving/transmitting active traffic for this host computer. The server application 115 records the internet protocol (IP) address of the host as a tag in association with a widget that present interface information for router 110B. The server application also records this tag in association with another related widget that presents bandwidth usage for router 110B. As recited in the examples of Table 1, the "10.106.165.30" tag, representing the IP address of the connected host, is inserted in association with the "Interfaces" widget and the "Bandwidth Usage" widget.

Continuing with FIG. 2, based on querying a widget data store, widget generation logic 136 determines the secondary widgets for the primary widget at block 220. In an embodiment, widget generation logic 136 uses the primary widget's identifier to retrieve one or more tags associated with the primary widget. Using the primary widget's tags, widget generation logic 136 retrieves other widget identifiers from the widget data store that are associated with the same tags as the primary widget. For example, using the exemplary widgets recited in Table 1, widget generation logic 136 may query for secondary widgets of the primary "CPU" widget that was triggered by an event. Widget generation logic 136 uses the "CPU" identifier of the primary widget to retrieve the identifiers of secondary widgets. Since the "CPU" widget shares the "Performance" tag with the "Interfaces" and "Bandwidth Usage" widgets and the "CPU" tag with the "Firewall Device" widget in Table 1, the identifiers for the "Interfaces", "Bandwidth Usage" and "Firewall Device" widgets are returned. Based on the returned identifiers, widget generation logic 136 determines that the "Interfaces," "Bandwidth" and "Firewall Device" widgets are secondary widgets associated with the primary widget.

3.4 Determining Arrangement of Secondary Widgets

Since user interfaces have limited space to display widgets, displaying a large number of secondary widgets of a primary widget may not be possible or may cause clutter of the user interface or require significant scrolling on the part of a user to view the widgets that might be most relevant to them. To ensure meaningful user experience and to maximize the limited display space of a user interface, techniques are described herein to arrange and/or limit the number of secondary widgets.

In an embodiment, at block 225, widget generation logic 136 determines correlation data between a secondary widget and a primary widget and arranges/excludes the secondary widget based on the correlation data. The term "correlation data" refers herein to a measure of relatedness between a secondary widget and a primary widget.

In an embodiment, the correlation data of a secondary widget is based on a priority value assigned to the secondary widget. Each widget may be assigned a priority value based on its relevance compared to others. The priority value may be stored in association with the identifier of the widget in a widget data store. In an embodiment, priority values are within a numeric range, such as 1-10, with the lowest or highest value representing the highest priority for a widget.

Table 2 below recites examples of priority values assigned to exemplary widgets of Table 1 with the priority value of "1" being the lowest priority and the priority value of "10" being the highest priority. Widget generation logic 136 may query the widget data store represented in Table 2 to retrieve the priority values for the determined secondary widgets of the "CPU" widget. Widget generation logic 136 may arrange the widgets based on a descending order of the retrieved priority values with the primary "CPU" primary widget first, followed by the "Interfaces" widget that has a priority value of "8," and then followed by the "Bandwidth Usage" widget that has a priority value of "5." Widget generation logic 136 may use the arrangement to display the widgets on user interface 134.

TABLE 2

Exemplary Portion of Data with Priority Information Represented in Widget Data Store

| Widget Identifier | Associated Tags | Priority |
|---|---|---|
| Firewall Device | Firewall Device, Router, Network Configuration, Network, AAA, Failover, Clustering, Identity, Licensing, Management, NAT, Netflow, Threat Detection, Anyconnect, WebVPN, L2L VPN, Access-list, Interfaces, CPU, Memory, 110B | 4 |
| CPU | CPU, Memory, Platform, Performance, Router | 10 |
| Interfaces | Performance, Network, Interfaces, Network Configuration, 10.106.165.30 | 8 |
| Bandwidth Usage | Network, Bandwidth, Performance, 10.106.165.30 | 5 |

In a related embodiment, priority values of widgets may be adjusted dynamically or configured by a user. Widgets may be assigned default priority values which may be adjusted based on changes in a state of associated managed system element. The server application managing managed system elements may detect a change in the state of the managed system elements and based on the change update the corresponding priority values in a widget data store. For example, router server application 115 detects for the "Interfaces" widget that an interface of the router is down and adjusts the default priority value of "8" to the highest priority value of "10" so the "Interfaces" widget can be arranged closer to the primary widget.

Additionally or alternatively, widget generation logic 136 may provide user interface controls for modifying priority values of widgets on user interface 134. Once user submits a modification of a priority value on user interface 134, widget generation logic 136 updates the widget data store replacing the old priority value for the widget with the new modified priority value. Any change in priority values may cause widget generation logic 136 (synchronously or asynchronously with the change) re-evaluate the arrangement of secondary widgets using the dynamically adjusted or user-configured new priority values.

In another embodiment, priority values (pre-configured, user-configured and/or dynamically adjustable) are assigned to category tags of widgets rather than to the widgets directly. If widget generation logic 136 determines that a widget is associated with a primary widget based on common category tags between the primary widget and the associated secondary widget, then widget generation logic 136 calculates the associated widget's priority value based on the priority values of these common category tags. The calculation may be based on summation or any other aggregation function (such as median, mean, maximum or minimum) applied to the priority values of the common category tags. Once a priority value for each secondary widget is calculated, widget generation logic 136 arranges the secondary widgets according to the calculated priority values.

Additionally or alternatively, widget generation logic 136 may eliminate one or more secondary widgets of a primary widget based on a threshold priority value configured for the primary widget. Any secondary widget that fails to reach or exceed the threshold priority value are eliminated from the arrangement by widget generation logic 136 and may not be displayed on user interface 134.

FIG. 4A depicts an example of user device 130 with user interface 134 presenting primary CPU widget 410, in an embodiment. Continuing with Table 2 as an exemplary representation of a widget data store, widget generation logic 136 determines correlation data for each widget with primary "CPU" widget 410. Based on common tags, the correlation data indicates that the secondary widgets "Interfaces," "Bandwidth Usage," and "Firewall Device" with priority values "8", "5" and "4" respectively are associated with primary CPU widget 410. Widget generation logic 136 is further configured to eliminate any secondary widgets that have a priority value that is lesser than "5". Accordingly, since the "Firewall Device" widget has a priority value of "4", the "Firewall Device" is eliminated from the arrangement to be displayed on user interface 134. The widget generation logic 136 arranges the remaining "Interfaces" and "Bandwidth Usage" widgets in descending order of their respective priority values. As depicted in FIG. 4A, "Interfaces" widget 420, having the highest priority value, is displayed the closest to primary "CPU" widget 410 followed by "Bandwidth Usage" widget 430.

In an embodiment, correlation data of a secondary widget includes an indication that a sensor of an associated managed system element has exceeded a threshold value as described above for generating a primary widget. To further conserve space on user interface 134, widget generation logic 136 may eliminate any widget with correlation data that indicates monitoring data failing to exceed a threshold value. The threshold value may be specific to the secondary widget and/or specific to the primary widgets for which the secondary widget is selected.

In a related embodiment, the threshold value for monitoring data of one or more secondary widgets may be user-configurable for each primary widget. In such an embodiment, widget generation logic 136 includes in the arrangement of secondary widgets only the secondary widgets with correlation data indicating exceeding of the user-configured threshold value.

FIG. 3 depicts an example of user interface 134 for configuring a threshold value for generating and displaying secondary widgets of primary CPU widget 310, in an embodiment. User interface control 320 may be used to select a threshold value for the secondary widgets' monitoring data. In FIG. 3, using user interface control 320, the secondary widget threshold value has been configured to "80%." Any secondary widget with monitoring data exceeding "80%" is included in the arrangement for primary CPU widget 310 to be displayed on user interface 134. In FIG. 3, bandwidth usage widget 330 and application data usage widget 340 have exceeded the user configured threshold in user interface control 320 of primary CPU widget 310. Thus, bandwidth usage widget 330 and application data usage widget 340 are displayed on user interface 134. The order in which the secondary widgets are displayed after the primary widgets may additionally depend on priority values associated with the secondary widgets.

FIG. 4B depicts user interface 134 presenting user interface control 440 for configuring the presentation of secondary widgets in addition to presenting both the primary widget as well as the secondary widgets, in an embodiment. As described above for FIGS. 4A and 4B, primary CPU widget 410 is generated and presented on user interface 134 in response to an event along with the associated secondary widgets. In addition, to presenting primary and secondary widgets, widget generation logic 136 generates and presents "Possible Causes" user interface control 440. "Possible Causes" user interface control 440 presents the currently configured threshold value for secondary widgets' monitoring data. Secondary widgets, "Bandwidth Usage" 430 and "Application Data Usage" 450, meet the threshold and thus, are generated and displayed on user interface 134. A user may select "Possible Causes" user control 440 and change the configured threshold value to a different value. In response to the change, the number of secondary widgets generated and displayed may change. The new number of secondary widgets depends on monitoring data thereof that exceeds the changed configured threshold. If the number of secondary widgets increases, user interface 134 may not be able to display all the additional secondary widgets due to limited screen place. However, a user may scroll the screen of client device 134 for display the rest of the secondary widgets.

Additionally or alternatively, the order may depend on the amount by which the monitoring data of a widget has exceeded any threshold value (pre-configured, user-configured and/or dynamically adjustable). The greater is the differential amount, the closer the secondary widget is arranged to the primary widget as discussed above.

Continuing with FIG. 2, at block 230, widget generation logic 136 generates and displays the determined secondary widgets in the determined arrangement on user interface 134. In an embodiment, one or more blocks of FIG. 2 may be combined or performed in parallel or out of order. For example, block 205 may be performed in parallel with blocks 215-225 or block 210 may be combined with block 230.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Extensions and Alternatives

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically generating a user interface for an application program, the method comprising the computer-implemented steps of:
    in response to detecting an event, selecting, by the application program, a primary widget from a plurality of widgets to display on the user interface;
    in response to selecting the primary widget, querying a data store that is storing tags associated with widgets, using one or more particular tags that are associated with the primary widget;
    based on the querying, determining one or more secondary widgets from the plurality of widgets, wherein the one or more secondary widgets are associated with at least one of the one or more particular tags of the primary widget;
    for each particular secondary widget among the one or more secondary widgets, determining correlation data that measures correlation of the particular secondary widget to the primary widget;
    based on the correlation data of the particular secondary widget, determining whether to display the particular secondary widget on the user interface in a particular arrangement comprising the particular secondary widget and one or more other secondary widgets from among the one or more secondary widgets.

2. The method of claim 1, wherein the primary widget presents monitoring data for a primary managed system element of a managed computer system, and the method further comprising detecting that the event triggered by the monitoring data of the primary managed system element exceeds one or more threshold values that have been configured for the primary widget.

3. The method of claim 1, further comprising detecting the event as a particular event that was triggered by a request to the application program to launch the primary widget.

4. The method of claim 1, wherein the primary widget comprises one or more graphical user interface controls that are programmed to configure a particular feature for a managed system element.

5. The method of claim 4, wherein the one or more secondary widgets comprise one or more secondary controls that are programmed to configure corresponding one or more features related to the particular feature for the managed system element.

6. The method of claim 1, wherein the correlation data for the particular secondary widget includes a number of tags associated with the particular secondary widget that matched the one or more particular tags of the primary widget.

7. The method of claim 1, wherein the particular secondary widget presents monitoring data for a particular managed system element, and wherein the correlation data for the particular secondary widget comprises indication whether the monitoring data for the particular secondary managed system element exceeded one or more threshold values for the particular secondary managed system element.

8. The method of claim 7, wherein at least one of the one or more threshold values for the particular secondary managed system element is associated with the primary widget; the method further comprising displaying the particular secondary widget in the user interface with the primary widget when the monitoring data for the particular secondary managed system element exceeds the at least one of the one or more threshold values for the particular secondary managed system element.

9. The method of claim 7, further comprising:
    determining the particular arrangement in the user interface for the particular secondary widget based on a priority value that has been assigned to the particular secondary widget;
    wherein the particular secondary widget, with the priority value that is greater than a second priority value assigned to another secondary widget, is arranged closer to the primary widget than the other secondary widget in the particular arrangement;

displaying the particular secondary widget on the user interface in the particular arrangement.

10. The method of claim 7, further comprising:

determining the particular arrangement for the particular secondary widget based on one or more amounts by which the monitoring data of the particular secondary managed system element exceeds the one or more thresholds for the particular secondary managed system element;

wherein the particular secondary widget, with the one or more amounts greater than one or more amounts of another secondary widget, is arranged closer to the primary widget than the other secondary widget in the particular arrangement;

displaying the particular secondary widget on the user interface in the particular arrangement.

11. A method for automatically generating a user interface for an application program comprising:

using a first computer, obtaining from one or more non-transitory computer-readable data storage media a copy of one or more sequences of instructions that are stored on the media and are arranged, when executed using a second computer among a plurality of other computers to cause the second computer to perform:

using a computer, in response to detecting an event, selecting, by the application program, a primary widget from a plurality of widgets to display on the user interface;

using the computer, in response to selecting the primary widget, querying a data store that is storing tags associated with widgets, using one or more particular tags that are associated with the primary widget;

using the computer, based on the querying, determining one or more secondary widgets from the plurality of widgets, wherein the one or more secondary widgets are associated with at least one of the one or more particular tags of the primary widget;

using the computer, for each particular secondary widget among the one or more secondary widgets, determining correlation data that measures correlation of the particular secondary widget to the primary widget;

using the computer, based on the correlation data of the particular secondary widget, determining whether to display the particular secondary widget on the user interface in a particular arrangement comprising the particular secondary widget and one or more other secondary widgets from among the one or more secondary widgets.

12. The method of claim 11, wherein the primary widget presents monitoring data for a primary managed system element of a managed computer system, and the method further comprising detecting that the event triggered by the monitoring data of the primary managed system element exceeds one or more threshold values that have been configured for the primary widget.

13. The method of claim 11, further comprising detecting the event as a particular event that was triggered by a request to the application program to launch the primary widget.

14. The method of claim 11, wherein the primary widget comprises one or more graphical user interface controls that are programmed to configure a particular feature for a managed system element.

15. The method of claim 14, wherein the one or more secondary widgets comprise one or more secondary controls that are programmed to configure corresponding one or more features related to the particular feature for the managed system element.

16. The method of claim 11, wherein the correlation data for the particular secondary widget includes a number of tags associated with the particular secondary widget that matched the one or more particular tags of the primary widget.

17. The method of claim 11, wherein the particular secondary widget presents monitoring data for a particular secondary managed system element, and wherein the correlation data for the particular secondary widget comprises indication whether the monitoring data for the particular secondary managed system element exceeded one or more threshold values for the particular secondary managed system element.

18. The method of claim 17, wherein at least one of the one or more threshold values for the particular secondary managed system element is associated with the primary widget; the method further comprising displaying the particular secondary widget in the user interface with the primary widget when the monitoring data for the particular secondary managed system element exceeds the at least one of the one or more threshold values for the particular secondary managed system element.

19. The method of claim 17, further comprising:

determining the particular arrangement in the user interface for the particular secondary widget based on a priority value that has been assigned to the particular secondary widget;

wherein the particular secondary widget, with the priority value that is greater than a second priority value assigned to another secondary widget, is arranged closer to the primary widget than the other secondary widget in the particular arrangement;

displaying the particular secondary widget on the user interface in the particular arrangement.

20. The method of claim 17, further comprising:

determining the particular arrangement for the particular secondary widget based on one or more amounts by which the monitoring data of the particular secondary managed system element exceeds the one or more thresholds for the particular secondary managed system element;

wherein the particular secondary widget, with the one or more amounts greater than one or more amounts of another secondary widget, is arranged closer to the primary widget than the other secondary widget in the particular arrangement;

displaying the particular secondary widget on the user interface in the particular arrangement.

\* \* \* \* \*